Aug. 22, 1933.　　　E. N. ROSENBERG　　　1,923,689
SUCTION MACHINE
Filed Dec. 11, 1931　　　2 Sheets-Sheet 1
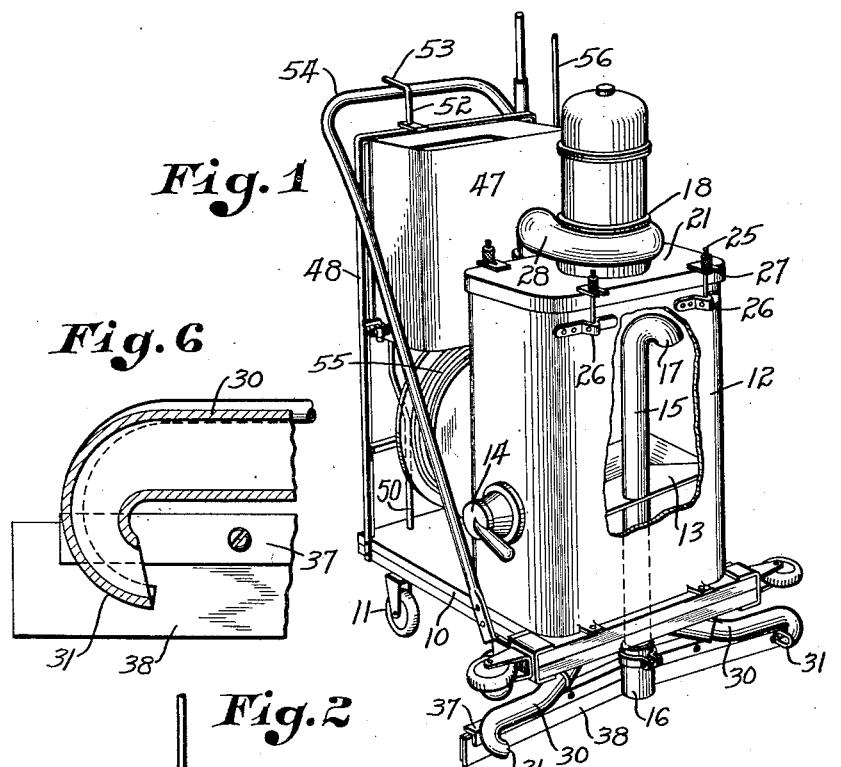
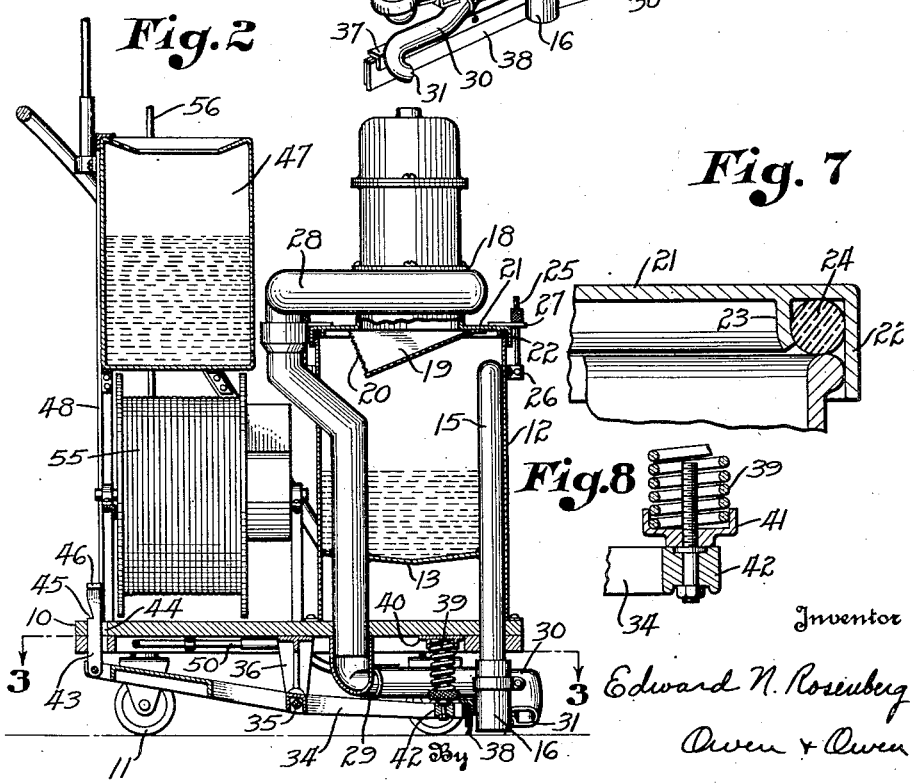
Inventor
Edward N. Rosenberg
Owen & Owen
Attorneys Aug. 22, 1933.  E. N. ROSENBERG  1,923,689
SUCTION MACHINE
Filed Dec. 11, 1931  2 Sheets-Sheet 2
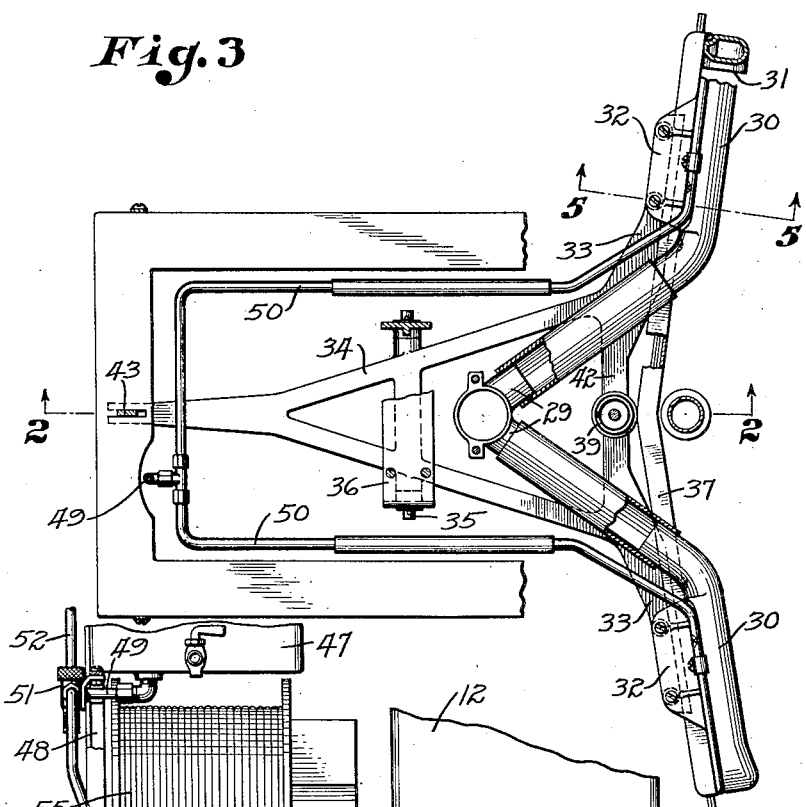
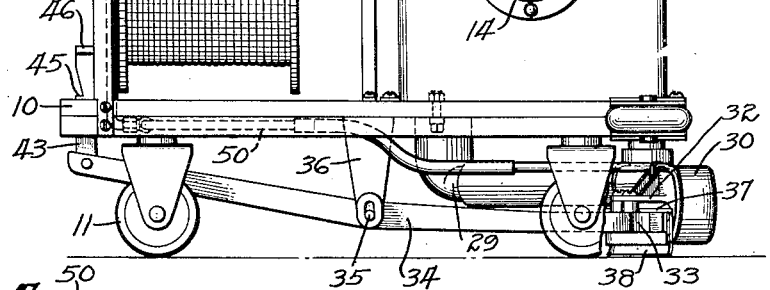
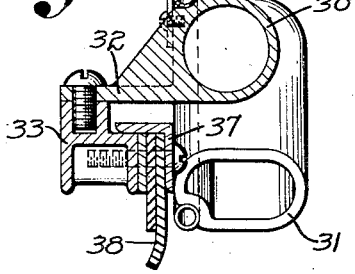

Patented Aug. 22, 1933

1,923,689

UNITED STATES PATENT OFFICE 1,923,689

SUCTION MACHINE

Edward N. Rosenberg, Toledo, Ohio, assignor to The National Super Service Company, Toledo, Ohio, a Corporation of Ohio Application December 11, 1931
Serial No. 580,249

5 Claims. (Cl. 15—50)

This invention relates to a suction machine which is primarily adapted for picking up water or other liquid, as for example, removing water from a floor after the latter has been scrubbed.

One object of the invention is to provide a suction mouth adapted to be moved over the surface of the floor, in combination with blowing apparatus for blowing the water along the surface of the floor toward said suction mouth. Preferably, the same air which is drawn through the suction mouth is returned through the blowing apparatus, means being provided for separating the air from the water after the latter has been lifted. The machine also is provided with a squeegee which is yieldingly urged against the floor and serves to accumulate the water in the path of the air current.

The above and other desirable features of the invention will be more particularly explained in connection with the accompanying drawings, in which—

Figure 1 is a perspective view of the invention with a part of the receiving tank broken away;

Figure 2 is a vertical longitudinal section of the machine taken substantially on the line 2—2 of Fig. 3;

Figure 3 is a horizontal section taken substantially on the line 3—3 of Fig 2;

Figure 4 is a partial side elevation of the machine;

Figure 5 is a section taken on the line 5—5 of Fig. 3;

Figure 6 is a detail sectional view of the discharge end of one of the air conduits;

Figure 7 is an enlarged detail view showing the seal for the top of the water receiving tank; and Figure 8 is a detail sectional view of the spring attachment for holding the squeegee against the floor.

The machine to which the invention appertains is mounted on a bed or carriage 10 which is supported by suitable wheels 11. Mounted upon the bed 10 is a water receiving tank 12 having a bottom 13 which is preferably spaced above the bed. The tank 12 is provided with an outlet 14 from which the collected water may be drained and with an inlet tube 15 having a suction mouth 16 adjustably secured to its lower end in proximity to the floor. Thus when a vacuum is produced within the tank 12, any water which may be on the floor beneath the mouth 16 will be drawn through the tube 15 and discharged from its upper end 17 into the tank.

The vacuum within the tank is created by an electric fan 18, or an equivalent device, supported above the tank 12 and having an air inlet 19 which is covered by a screen 20 to separate the water from the air current which passes through the fan. The fan casing is integrally or otherwise connected to the top 21 of the tank so as to form an air tight connection. In order to provide a seal between the cover 21 and the tank 12, the cover is provided with a depending rim 22 adapted to extend over the rim of the tank 12 and also with an inner flange 23. A strip of rubber or other packing material 24 acts as a gasket between the cover and the tank. Provision is made for drawing the cover down against the tank by means of clamping bolts 25 which are mounted in brackets 26 secured to the sides of the tank and connected with ears 27 secured to the cover.

The fan 18 has an outlet conduit 28 with two branches 29 which are connected to tubes 30 having inturned discharge mouths 31. Thus the air which is sucked in by the fan through the mouth 16 is discharged from the opposed mouths 31 in a manner to blow the water along the surface of the floor to facilitate the sucking up of the same through the suction mouth 16. The tubes 30 are of special shape and provided with flanges 32 which are adapted to be secured to the outwardly turned arms 33 of a frame 34 which is pivoted at 35 to a bracket 36 secured to the bed 10. Thus by rocking the frame 34 about its pivot the blower tubes 30 may be raised or lowered. A bar 37 is also secured to the arms 33 in a manner to clamp a squeegee 38 thereto. A spring 39 is mounted between a seat 40 secured to the bottom of the bed 10 and a seat 41 in the form of a nut adapted to be turned up or down on a threaded bolt secured to a cross bar 42 which is part of the frame 34. Normally the spring 39 forces the front end of the frame 34 downwardly about its pivot and forces the squeegee 38 against the floor and the tension of the spring 39 may be adjusted by adjusting the seat 41 up or down with reference to the cross bar 42.

It will be noted that the bar 37 and squeegee 38 have a slight rearward inclination from the ends to the center thereof where the suction mouth 16 is located. This inclination, when the machine is moving forwardly with the squeegee held firmly against the floor, in connection with the inwardly directed currents of air from the blower mouth 31 causes the water to flow along the surface of the floor toward the mouth 16 through which it is picked up and discharged into the tank 12.

In order that the machine may be easily moved from one place to another when it is not being operated, provision is made for locking the frame 34 with its forward end raised so that the squeegee 38 is out of contact with the floor. For this purpose a latch member 43 is pivotally connected to the rear end of the frame 34 and extends upwardly through a slot 44 in the bed 10. The latch member 43 is provided with a shoulder 45 and with a head 46 which is adapted to be engaged by the operator's foot. In this manner the rear end of the frame 34 may be depressed sufficiently to raise the squeegee 38 from the floor and may be locked in this position by engaging the shoulder 45 with the lower edge of the slot 44.

Rinsing water may be carried in a tank 47 which is supported in an elevated position by a frame 48 secured to the bed 10. The tank 47 has an outlet 49 with two branches 50 which extend alongside the tubes 30 and terminate adjacent the blower mouths 31. The discharge of the rinsing water through the tubes 50 is controlled by a valve 51 in the outlet 49. This valve is opened or closed by means of a stem 52 having a handle 53 adjacent the handle bar 54 by which the travel of the machine over the floor is controlled. A reel 55 may be provided for carrying the electric cord 56 by which current is supplied for operating the fan 18.

In the operation of this machine as it is moved forwardly over the floor, the water is collected in front of the squeegee which, by adjusting the tension of the spring 39, may be caused to hug the floor with any desired pressure. The air from the blower tubes assists in collecting the water beneath the suction mouth 16, where it may be readily drawn up into the tank 12. Thus it is unnecessary for the squeegee to have more than a slight rearward inclination toward the suction mouth and as a consequence the latter may be located at the center of the squeegee where the water is collected and yet be on the front line of the machine, so that it may be moved up close to the baseboards at the sides of the room.

The machine has the additional advantage that a single fan, pump or equivalent device may be used for drawing the air and water through the suction mouth 16 and for returning the same air through the blower mouths 31 which constitute branches of a closed circuit.

The supply of fresh water from the tank 47 to rinse the floor or to clean the squeegee may be controlled at the will of the operator through the valve 51.

The squeegee carried by the pivoted frame 34 may be locked by the operator in an inoperative position or may be released so that it hugs the floor under the influence of the adjustable spring 39. Preferably the pivot 35 has some vertical play, as indicated in Fig. 4, to allow for irregularities in the surface of the floor.

While I have shown and described in detail the preferred form of the invention, it is apparent that the structure may be considerably modified without departing materially from the scope of the invention as defined by the appended claims.

What is claimed is:

1. In a suction machine, a carriage movable along the floor, a squeegee supported by the carriage and engageable with the floor, a suction conduit having an intake mouth near the floor in front of the squeegee, means for separating liquid particles from the air current that passes through said conduit and collecting the same, and means for discharging contiguous streams of water and air under pressure and directing the same along the surface of the floor towards said mouth.

2. In a suction machine, a carriage movable along the floor, a squeegee supported by the carriage and engageable with the floor, said squeegee having a slight rearward inclination from each end toward the center thereof, a suction conduit having an intake mouth near the floor in front of the center of the squeegee and adjacent to the front line of the machine, means for collecting water particles picked up by the air current that passes into said mouth, and means for blowing air along the surface of the floor towards said mouth.

3. In a suction machine, a carriage movable along the floor, a squeegee supported by the carriage and engageable with the floor, said squeegee extending at a slight rearward angle from each end toward the center thereof, a suction conduit having an intake mouth near the floor in front of the center of the squeegee and adjacent the straight line connecting the ends of the squeegee, means for collecting liquid picked up by the air current which is drawn into the suction conduit, and means for blowing air along the surface of the floor in front of the squeegee from each end thereof toward said mouth.

4. In a suction machine, a carriage movable along the floor, a squeegee supported by the carriage and engageable with the floor, said squeegee having a slight rearward inclination from each end toward the center thereof, a suction conduit having an intake mouth near the floor in front of the center of the squeegee and adjacent a straight line through the ends of the squeegee, means for collecting liquid particles from an air current passing through said conduit, and means for creating a flow of air through said conduit and returning a considerable part of the same along the surface of the floor.

5. In a suction machine, a carriage movable along the floor, a squeegee supported by the carriage and engageable with the floor, said squeegee having a slight rearward inclination from each end toward the center thereof, a suction conduit having an intake mouth near the floor in front of the center of the squeegee and adjacent a straight line through the ends of the squeegee, means for collecting liquid particles from an air current passing through said conduit, and means for causing a current of air to flow to a considerable extent in a closed circuit through said conduit and collecting means and thence in two branches along the surface of the floor in front of the squeegee from each end thereof toward said mouth.

EDWARD N. ROSENBERG.